United States Patent Office 3,566,553
Patented Mar. 2, 1971

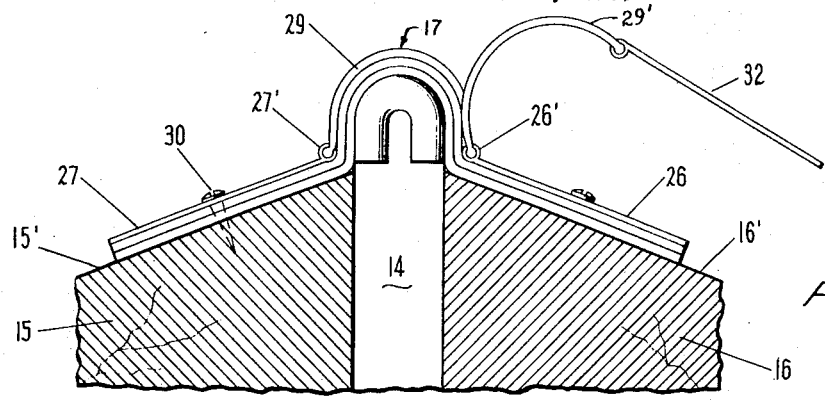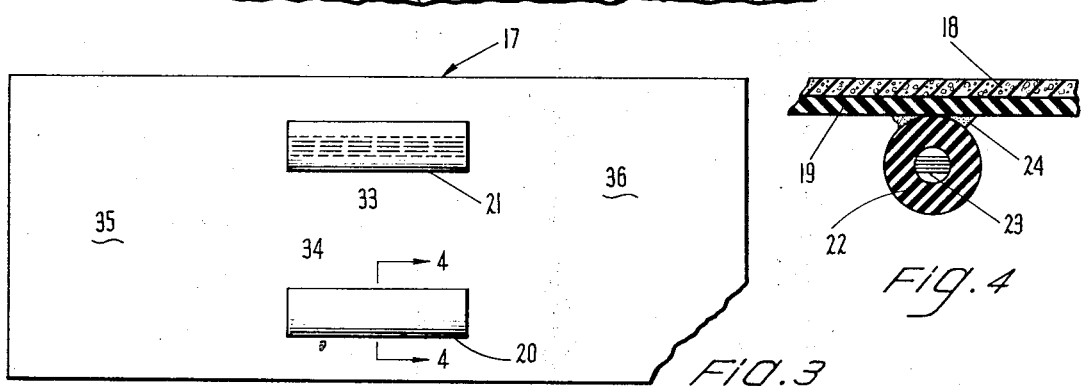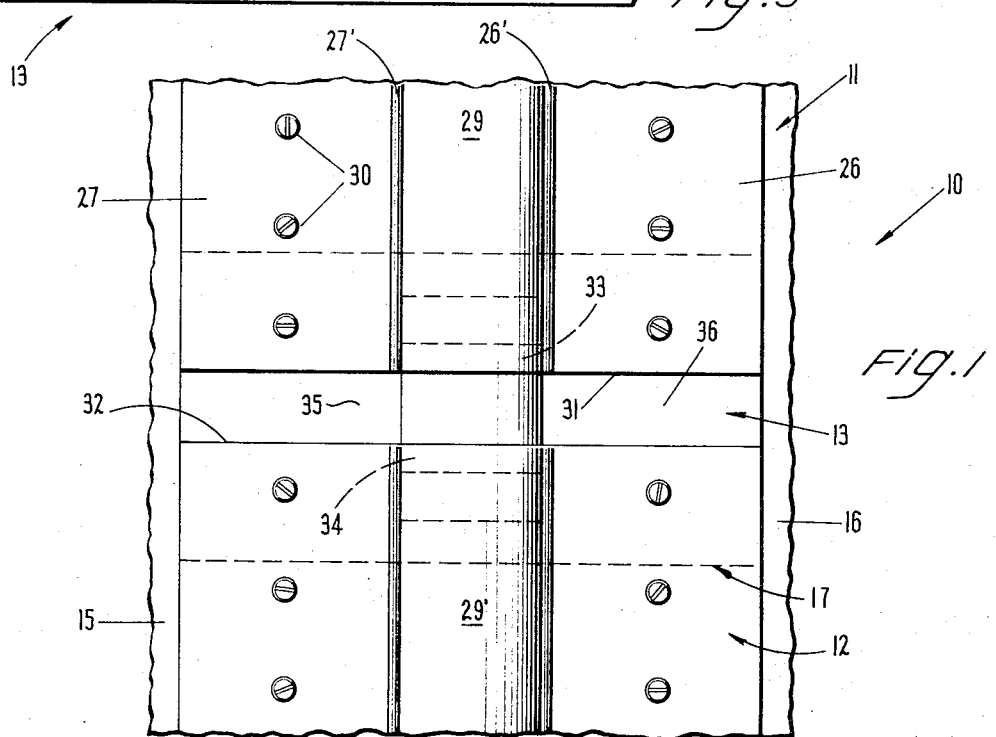

3,566,553
DRY JOINT SPLICE
Irving H. Kellman, Springvale, Maine, assignor to Sandell Manufacturing Company, Inc., Cambridge, Mass.
Filed Mar. 19, 1969, Ser. No. 808,507
Int. Cl. E04d *1/36, 3/38*
U.S. Cl. 52—57  6 Claims

ABSTRACT OF THE DISCLOSURE

A dry splice means for an expansion joint construction interconnects expansion joint members as in a roof expansion joint construction. The dry splice has a resilient, flexible weatherproof sheet operatively associated with spring means for urging the sheet to close a space between joint members with the sheet being constantly urged against the members substantially at opposed ends of the sheet. The splice means preferably comprises the resilient, flexible sheet with two opposed leaf springs attached to one surface of the sheet so that when the sheet is flexed, the springs are biased to urge the sheet into sealing engagement.

BACKGROUND OF THE INVENTION

A wide variety of roof expansion joints are known in the art. Expansion joints are necessary where vertically or horizontally extending openings are left in buildings due to constructional requirements. Common roof expansion joints have anchor members mounted on opposed surfaces or edges of such openings with centrally located interconnecting spanning members attached at ends thereof to the anchoring members and extending along the elongated openings. The expansion joints provide for expansion and contraction of the opening during various environmental conditions. Frequently there is a problem in interconnecting ends of the expansion joint structures used in a rapid, efficient, inexpensive and weatherproof operation. The prior art has often used various conventional roofing materials which are positioned over gaps between ends of expansion joint members and adhered thereto by mechanical as well as liquid or semisolid adhesive means. Frequently caulking materials such as bitumen or asphalt are applied to weatherproof such joints. The use of liquid or semisolid sealants and caulking materials is time consuming and sometimes expensive.

It is an object of this invention to provide a splice for interconnecting expansion joint constructions which splice can be rapidly and easily applied.

Another object of this invention is to provide a dry splice in accordance with the preceding object which does not require the use of liquid or semisolid adhesives and sealants; yet, produces weathertight connections over a wide range of environmental conditions for long periods of time.

Another object of this invention is to provide a joint construction utilizing the dry splice in accordance with the preceding objects which joint construction is highly suitable for use in forming a joint between portions of a building.

SUMMARY OF THE INVENTION

According to the invention, a dry splice means is provided for interconnecting and spanning a space between two nonplanar surfaces of a joint construction. The dry splice means comprises a splice sheet of a resilient, flexible, weatherproof material having an outer surface and an inner surface with opposed first and second portions of the outer surface being adapted to be pressed against nonplanar first and second surfaces of the joint construction. First and second spring means are mounted adjacent the inner surface at said first and second portions for urging the outer surface against the first and second surfaces of the joint construction upon flexing of the spring means to position the splice sheet.

The joint construction in which the dry splice is preferred for use is formed over a gap defined by opposed first and second mounting surfaces. The joint construction comprises first and second joint members each having a splice end and defining a space therebetween. Each of the joint members have opposed anchoring strips overlying the first and second mounting surfaces respectively. The anchoring strips of the first and second joint members are connected by a first curved spanning member and the anchoring strips of the second joint member are interconnected by a second curved spanning member. The splice means closes the space between the splice ends of the joint members to form a weathertight joint between first and second joint members. The splice means comprises a splice sheet of flexible weatherproof material having an outer surface and an inner surface with opposed first and second portions of the outer surface underlying and being pressed against the first and second curved spanning members in weathertight relationship. Spring means mounted adjacent the inner surface of the splice sheet and underlying portions of the first and second spanning members urge the first and second portions of the splice sheet against the spanning members.

According to the method of this invention, a dry splice is formed between ends of two joint members defining a space therebetween and each having a curved spanning member overlying a gap to be closed. A dry splice means is positioned over the space and a portion of the splice means is resiliently curved to conform to the curve of the spanning members. The splice means is constantly urged against the spanning members by the use of spring means to form a dry seal with each spanning member.

It is a feature of this invention that a dry splice can be made rapidly and efficiently using conventional tools. An important advantage of the invention is the elimination of any need for wet or semisolid materials to form a weatherproof splice when the splice means of this invention is used in a roof expansion joint construction. In spite of the dry nature of the splice, it forms weatherproof seals for long periods of time under normally encountered environmental conditions.

BRIEF DESCRIPTION OF THE DRAWINGS

The above and other objects, advantages and features of the present invention will be better understood from the following specification when read in the light of the accompanying drawings in which:

FIG. 1 is a top plan view of a completed joint construction with a dry splice in accordance with the preferred embodiment of this invention;

FIG. 2 is an end view thereof with one element partially in place;

FIG. 3 is a bottom view of an element thereof; and

FIG. 4 is a cross sectional view taken through line 4—4 of FIG. 3 and rotated 90° clockwise.

DESCRIPTION OF THE PREFERRED EMBODIMENTS

With reference now to the drawings, an expansion joint construction for a roof opening is indicated generally at 10 in FIG. 1 having identical joint members 11 and 12 spliced together in watertight relationship by a preferred embodiment of the splice means 13 of this invention. The joint construction covers an elongated horizontally extending gap 14 formed between two roof elements 15 and 16 having opposed mounting surfaces 15′ and 16′, respectively.

The splice means 13 is made up of a uniform thickness sheet 17 formed of a resilient, flexible, weatherproof material such as neoprene. Preferably the sheet 17 is a composite sheet having a first layer of a closed cell foam such as neoprene foam 18 and an underlying bottom layer 19 of a soft neoprene ruubber. Neoprene is preferred for use in both layers 18 and 19 or as a single layer of a sheet such as 17 because of its good resistance to weathering, impenetrability, resiliency and adaptability to conform to desired shapes. However, other resilient flexible materials can be used such as other synthetic rubbers, natural rubber, polyurethanes, polyethylenes, vinyls and the like.

In a typical application as in the preferred embodiment, the neoprene layer 19 has a thickness of 0.060 inch and the closed cell foam layer 18 has a thickness of 0.125 inch. However, the thickness of the layers and the resulting thickness of the composite sheet 17 can vary considerably depending upon the particular application in which it is used. Preferably the two layers 18 and 19, when a composite sheet is used, are bound uniformly together as by an adhesive and/or vulcanization.

The lower or inner surface of the sheet 17 carries two spring means 20 and 21 each of which are preferably parallel with and identical to the other. The spring means are positioned between side edge portions 35 and 36 of the peferably rectangular splice sheet as best shown in FIG. 3. The spring means 20 and 21 are made up of short lengths of flexible tubing 22 which may be rubber tubing adhered to the inner surface by a conventional adhesive 24. Within the hollow passageway of each tube 22 is located a flat leaf spring 23 substantially coplanar with the plane of the sheet 17. Each spring 23 may be a single flat band or a plurality of flat bands placed adjacent each other as best shown in FIG. 4. Each spring 23 preferably extends throughout the length of the tube within which it is mounted.

The splice means 13 is adapted, when its center part is formed into a nonplanar configuration, to urge the outer surface of the splice sheet 17 against any abutting nonplanar surfaces as will be described with relation to FIG. 2.

As best shown in FIGS. 1 and 2, the splice means is preferably used with joint members of the type shown at 11 and 12 to form the joint construction 10. Joint members 11 and 12 are identical and only one will be described. Joint member 11 is made up of two identical opposed anchor strips 26 and 27 defining inner, elongated ends 26' and 27', each formed into an elongated, continuous socket receiving member. The socket receiving members at ends 26' and 27' are swedged about enlarged longitudinally extending edges of a flexible gap spanning sheet 29 preferably formed of a flexible, weatherproof, deterioration-resistant material such as neoprene rubber or plastics of the type which may be used for the splice sheet 17. The anchor strips 26 and 27 are adapted to be used as shown in FIGS. 1 and 2 extending for long lengths over edges forming horizontally extending gaps such as 14. The anchor strips are mounted on mounting surfaces on either side of the gap 14 by means of screws, nails or the like with screws 30 being illustrated in the figures. In position over the gap, the spanning sheet 29 is formed into an inverted U thus having a nonplanar inner surface. Problems arise when, because of various conditions such as extremely long gaps 14, joints must be formed between splice ends 31 and 32 of two joint members as shown in FIG. 1. It is here that the prior art has turned to wet splices where cover strips of flexible materials were placed over the space formed between the splice ends 31 and 32 and adhered in position with various sealants, caulkings and the like as well as with mechanical means.

In accordance with this invention, the splice means 13 is slipped into the position shown in FIG. 1 with opposed portions 33 and 34 underlying portions of the first and second gap spanning members 29, 29', respectively, of the joint members 11 and 12 respectivly. The central portion of the splice sheet 13 is resilient flexed into the curved position shown in FIG. 2 so that the spring means 20 and 21 constantly urge the sheet 17 against the nonplanar undersurfaces provided by the spanning sheets 29 of the joint members 11 and 12. Portions of the splice sheet underlie each of the anchoring strips and are locked in position by suitable screws 30 as shown in FIGS. 1 and 2. The screws 30 act to force the ends of the anchoring strips to resiliently compress the overlapped portions of the splice sheet 17 forming a seal therewith.

In its final configuration, the splice means 13 has the same cross sectional configuration as that of the joint members 11 and 12 even at the space between ends 31 and 32 which is preferably kept as small as possible and preferably no greater than 12 inches. Where greater spaces between ends 31 and 32 are to be spliced together, additional mechanical means such as screws 30 may be used directly through the portions 35 and 36 of the splice.

While a specific embodiment of this invention has been shown and described, it should be understood that many variations thereof are possible. For example the dry splice means of this invention is particularly adapted for use in roof expansion joints although the dry splice can also be used in horizontally extending joints as well as vertically extending joints of other types. The splice means can be useful in connection with expansion joint and nonexpansion joint members of various types as in interior joints, hoods and the like. While flat springs are preferred for use in this invention in conjunction with tubes such as 22 which prevent the springs from cutting the splice sheet 17, the springs can be attached directly to the undersurface of the sheet 17 or incorporated therein. Alternatively other cushioning means such as flat bands of a flexible plastic or rubber can be adhered to the splice sheet with the springs adhered to or carried in the cushioning bands. This construction is not preferred since it does not provide as much resistance against cutting of the splice sheet 17 as does the tubular construction. In some cases, flat cushioning strips can be positioned intermediate the flat springs 23 and the undersurface of the sheet 17. While flat springs are preferred for use, other spring configurations which resiliently urge the sheet 17 against members to be sealed can be used.

What is claimed is:

1. A dry splice means for interconnecting first and second nonplanar surfaces of a joint construction:

said splice comprising a splice sheet of resilient, flexible, weatherproof material having an outer surface and an inner surface with opposed first and second portions of said outer surface being adapted to be pressed against the nonplanar first and second surfaces of said joint construction, and first and second spring means mounted adjacent said inner surface at said first and second portions and between outwardly extending side edge portions of said splice sheet, for urging said outer surface against said first and second surfaces of said joint construction upon flexing of said spring means, said first and second spring means comprising flat leaf springs parallel to each other and lying in at least one plane parallel to a plane in which said splice sheet lies, said leaf springs being carried in cushioning resilient tubes adhered to said splice sheet.

2. A dry splice means in accordance with claim 1 wherein said splice sheet comprises an outer layer of a closed cell foam material carried by said splice sheet outer surface.

3. A joint construction for forming a weatherproof joint over an elongated gap defined by opposed first and second mounting surfaces, said joint construction comprising first and second elongated joint members each having a splice end and defining an elongated space therebetween, each of said joint members comprising opposed first and second elongated anchoring strips overlying said first and second mounting surfaces respectively, said anchoring strips of said first joint member being interconnected by a first curved spanning member defining a curved portion overlying said gap and the anchoring strips of said second joint member being interconnected by a second curved spanning member defining a curved portion overlying said gap, a splice means closing said space to form a weathertight splice with said first and second joint members, said splice means comprising a splice sheet of flexible weatherproof material having an outer surface and an inner surface with opposed first and second portions of said outer surface underlying and being pressed against said first and second curved spanning members in weathertight relationship therewith, and spring means mounted in operative relationship to an outer surface of said splice sheet and underlying a portion of each of said first spanning member and said second spanning member for constantly urging said first and second portions of said splice sheet against said spanning members in dry weathertight sealing engagement.

4. A joint construction in accordance with claim 3 wherein a cushioning means is interposed between said splice sheet and said spring means.

5. A joint construction in accordance with claim 3 wherein:
said spring means comprises first and second leaf springs spaced from and parallel to each other.

6. A joint construction in accordance with claim 5 wherein said first and second leaf springs are formed into a curved shape coextensive with the curve of said spanning member.

References Cited

UNITED STATES PATENTS

| | | | |
|---|---|---|---|
| 1,357,713 | 11/1920 | Lane | 52—573 |
| 2,722,237 | 11/1955 | Rosel | 138—174 |
| 3,300,913 | 1/1967 | Patry et al. | 52—58 |
| 3,313,674 | 4/1967 | Mathews | 52—309 |
| 3,422,733 | 1/1969 | Connell | 94—18 |
| 3,470,662 | 10/1969 | Kellman | 52—573 |

FRANK L. ABBOTT, Primary Examiner

J. L. RIDGILL, Jr., Assistant Examiner

U.S. Cl. X.R.

52—58, 459, 573